United States Patent
King et al.

(10) Patent No.: US 6,856,488 B2
(45) Date of Patent: Feb. 15, 2005

(54) METHOD AND APPARATUS FOR REDUCING READ/WRITE HEAD WEAR WHILE MAINTAINING TAPE PATH AND TENSION DURING SEARCH MODE

(75) Inventors: Peter King, Thornbury (GB); John Geoffrey Fisher, North Nibley (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 222 days.

(21) Appl. No.: 10/118,888

(22) Filed: Apr. 10, 2002

(65) Prior Publication Data

US 2002/0159195 A1 Oct. 31, 2002

(30) Foreign Application Priority Data

Apr. 26, 2001 (GB) ............................................. 0110244

(51) Int. Cl.⁷ ............................ G11B 5/54; G11B 21/22
(52) U.S. Cl. ..................................... 360/251; 360/251.1
(58) Field of Search ..................... 360/251, 251.1–251.5

(56) References Cited

U.S. PATENT DOCUMENTS

| | | | | |
|---|---|---|---|---|
| 3,169,720 A | * | 2/1965 | Proctor | ........................ 360/251 |
| 3,185,484 A | * | 5/1965 | Burdeno | ........................ 360/251 |
| 3,333,065 A | * | 7/1967 | Torok | ........................... 360/251 |
| 4,328,520 A | * | 5/1982 | Iwata et al. | ............... 360/251.3 |
| 5,179,486 A | | 1/1993 | Kraemer et al. | |
| 5,377,061 A | * | 12/1994 | Yoshimura | ................ 360/251.1 |
| 5,995,331 A | * | 11/1999 | Kunze et al. | ............. 360/251.3 |

FOREIGN PATENT DOCUMENTS

| | | | | |
|---|---|---|---|---|
| EP | 0 744 736 A2 | | 11/1996 | |
| JP | 60173715 A | * | 9/1985 | ............. G11B/5/54 |
| JP | 7-272232 | | 10/1995 | |
| JP | 8-273250 | | 10/1996 | |

\* cited by examiner

*Primary Examiner*—Craig A. Renner

(57) ABSTRACT

The read/write head assembly of a tape drive device is moved from a first read/write position to a second non-read/write position. A tape engaging surface maintains tape tension and path in the non-read/write position. Movement of the read/write head assembly to a non-read/write position prevents read/write head element wear during tape searching.

20 Claims, 5 Drawing Sheets

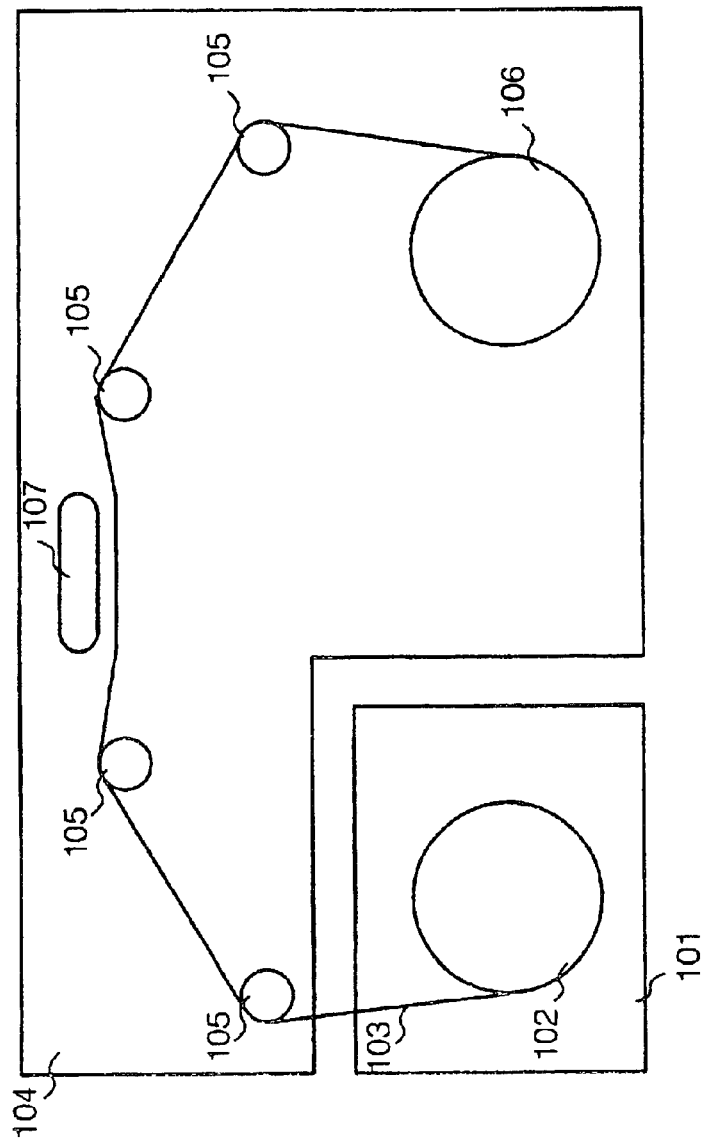

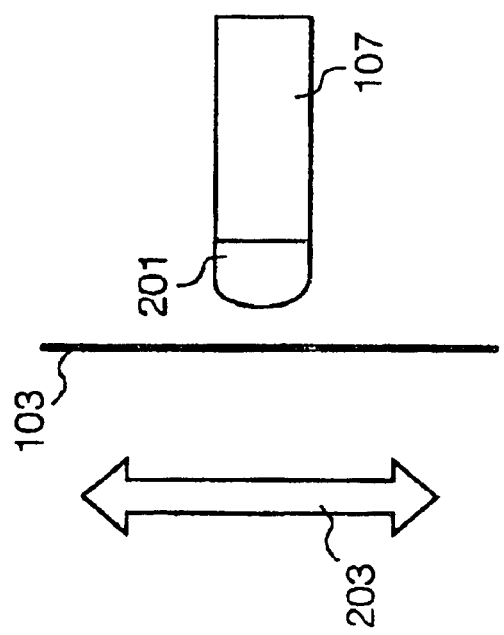
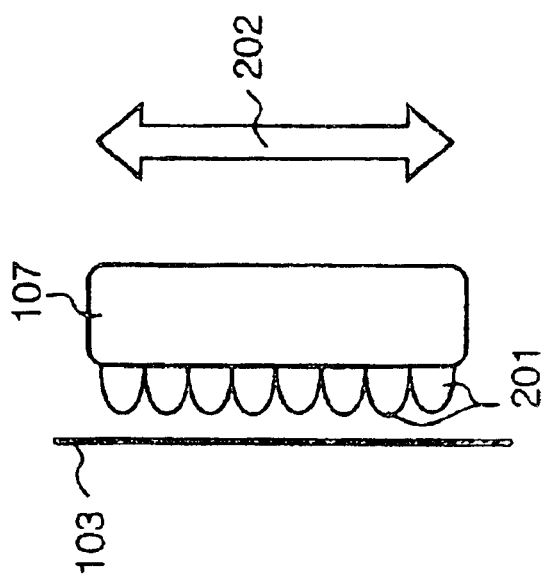

METHOD AND APPARATUS FOR REDUCING READ/WRITE HEAD WEAR WHILE MAINTAINING TAPE PATH AND TENSION DURING SEARCH MODE

FIELD OF THE INVENTION

The present invention relates to apparatus for magnetic reading and/or writing of data on tape, and particularly, although not exclusively, relates to apparatus to prevent wear of magnetic read/write elements during tape searching.

BACKGROUND TO THE INVENTION

In order to store data, including digital electronic data, such as back-up data from a server computer device, it is known to use magnetic tape data storage cartridges comprising one or a pair of rotatable reels and an elongate band of magnetic tape. One reason for using such tape data storage cartridges is to make back-up copies of important data. Another reason for using such tape data storage cartridges is for use in archiving data.

Tape drive apparatus is known in the prior art. Such prior art tape drive apparatus is known, in some examples, to comprise drive means to drive movement of an elongate magnetic tape in order to transfer tape between two rotatable reels on a tape data storage cartridge. Transfer of magnetic tape passes the elongate tape past a magnetic read/write head enabling data to be written to, or read from, the magnetic tape.

An alternative prior art tape drive arrangement is illustrated in FIG. 1. FIG. 1 illustrates a linear tape drive 104 and tape data storage cartridge 101. Tape data storage cartridge 101 comprises one rotatable reel 102 comprising a reel of an elongate band of magnetic tape 103. On placing tape data storage cartridge 101 into linear tape drive 104 the elongate band of magnetic tape is introduced to the linear tape drive 104. One or a plurality of guides 105 are used to thread the tape from cartridge reel 102 to tape drive reel 106. The threaded tape is thus presented to a read/write head 107 enabling data to be read from, or written to, tape 103. FIG. 1 illustrates a gap between read/write head and tape 103, this is for clarity, in practice, tape 103 is in contact with the read/write head 107 to enable reading or writing of data.

FIG. 2A and FIG. 2B illustrate diagrammatic representations of the structure of a typical read/write head assembly known to be used in prior art tape drives. Referring to FIG. 2A, a section through the width of tape 103 is shown. The read/write head 107 comprises a plurality of read/write head elements 201 assembled to form a multi-channel head assembly which is maintained in contact with the surface of tape 103 by tension in the tape. Each of the read/write head elements 201 is configured to permit reading/writing of data to physical tracks on tape 103. The read/write head 107, in some prior art examples, is configured for limited transverse movement across the width of tape 103 as indicated by arrow 202. In the prior art, this movement is limited to movement substantially within the width of tape 103 to enable reading/writing of data to physical tracks on tape 103. It is not known in the prior art for read/write head 107 to be translationally displaced beyond the periphery of the tape width.

FIG. 2B illustrates a diagrammatic representation of the read/write head illustrated in FIG. 2A, FIG. 2B illustrating a top view looking down on the length of elongate tape 103. FIG. 2A illustrates a side view of this arrangement. Referring to FIG. 2B, arrow 203 illustrates the possible directions of tape motion past read/write head 107. In both FIG. 2A and FIG. 2B a gap between tape 103 and read/write head elements 201 is illustrated for clarity, in practice the tape surface is in contact with the read/write head elements 201.

Considering the prior art tape drive arrangements described above, the head elements 201 are maintained in contact with the tape 103. As tape 103 moves past the read/write head 107, the head is subject to wear. As the tape 103 is maintained in contact with read/write head elements 201, this wear is also present during tape searching, such as in a fast forward or rewind mode. Particularly considering use of prior art tape drives in archiving arrangements where tape data is rapidly searched to locate a required data set, the ratio of tape movement to data access is significantly higher than in, for example, back-up applications. Accordingly, the serviceable lifetime of such prior art tape drives is reduced due to increased wear of read/write head elements 201 during searching.

There is therefore a technical problem with prior art tape drives in that maintaining contact of tape 103 with read/write head elements 201 during tape searching significantly decreases the lifetime of the read/write head 107.

One solution to this problem known in the prior art is to loosen the tape tension. This is unsatisfactory and causes problems with tape threading and accurate reading and writing of data to the tape. Another solution known in the prior art is to introduce a stream of air between the read/write head 107 and tape 103 during searching to lift the tape 103 from contact with the read/write head elements 201. This is a complex solution significantly increasing the complexity of the tape drive apparatus and the associated cost of manufacture.

JP 08273250 A discloses a tape recorder with excess tape contact pressure prevention during forward/reverse operation. Whilst relieving excess tape contact pressure with a head is considered, this prior art disclosure does not overcome the problems of how to maintain tape tension during tape search whilst eliminating head wear during search.

U.S. Pat. No. 5,179,486 discloses apparatus operable to align a record/play back head with respect to different parallel tracks of a tape. Means is provided to move the record/play back head transversely with respect to the tape in order to align the record/play back head with respect to tracks on the tape. However, this movement is within the width of the tape and this prior art disclosure does not consider substantially complete displacement of the read/write head from the tape surface.

In order to improve the service life time of tape drives, apparatus for reducing read/write head element wear, particularly during searching of a tape, will be of benefit.

SUMMARY OF THE INVENTION

Specific embodiments according to the present invention aim to reduce the wear of a read/write head in a tape drive apparatus configured to magnetically read and/or write data from/to magnetic tape.

Specific embodiments of the present invention aim to increase the serviceable life time of tape drive apparatus.

The specific embodiments of the present invention aim to overcome the technical problems relating to wear of read/write heads in prior art tape drive apparatus.

According to a first aspect of the present invention there is provided apparatus for magnetic reading and/or writing of data on tape, said apparatus operable in a data mode and search mode, said apparatus comprising:

a read/write head; and positioning means configured to position said read/write head in first and second positions;

wherein during operation in said data mode said read/write head is in said first position substantially in contact with said tape to permit reading/writing of data from/to said tape; and wherein during operation in said search mode, said read/write head is in said second non-read/write position, said read/write head displaced from contact with said tape; and said read/write head configured for movement between said first and second positions;

characterised in that:

during operation in said search mode, said positioning means contacts said tape to maintain tape path and tension, and wear of said read/write head in said second position being prevented.

According to a second aspect of the present invention there is provided a method of reducing read/write head wear in an apparatus according to the first aspect of the present invention comprising the step of:

moving said read/write head from said first position to said second position for tape searching thereby preventing read/write head wear during said search mode.

Preferably, said method further comprises the step of contacting said positioning means and said tape during said search mode to maintain tape path and tension.

According to a third aspect of the present invention there is provided a tape transport mechanism comprising:

a plurality of guides for guiding a magnetic tape;

a transducer head for converting between electrical signals and magnetic signals; and a carriage mechanism upon which said transducer head is mounted, said carriage mechanism comprising a tape contact surface, said tape contact surface being spaced apart from a surface of said transducer head, the arrangement being that said carriage operates to position said transducer head into a first position in which said transducer head is positioned in a tape pathway defined by said tape guidance means, and a second position in which said tape contact surface is positioned in said tape pathway.

Other aspects according to the present invention are as defined in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 1 illustrates diagrammatically a prior art arrangement of a tape data storage cartridge 101 and linear tape drive 104 illustrating a typical tape path through the tape drive presenting the tape to a read/write head;

FIG. 2A illustrates a diagrammatic side view of a prior art arrangement of the presentation of a tape surface to one or a plurality of read/write head elements 201;

FIG. 2B illustrates diagrammatically a top view of a prior art arrangement for the presentation of a tape surface to one or a plurality of read/write head elements 201;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, a read/write head comprises a head configured for the reading or playback of data and/or the writing or recording of data to said tape. A read/write head comprising one or a plurality of read/write head elements configured to read from and/or write to physical tracks on said tape. A read/write head may comprise a magnetic head element configured only for reading of data from, or writing of data to, said tape.

In this specification, a tape drive shall comprise apparatus for magnetic reading and/or writing of data on tape and includes, but is not limited to, linear tape drives for the reading and/or writing of data from/to tape data storage cartridges comprising a single rotatable reel and also to tape drives configured for the reading and/or writing of data to/from tape data storage cartridges comprising a plurality of rotatable reels.

In this specification, data mode shall comprise the mode of operation of a tape drive during which data is read from or written to magnetic tape. In a data mode, the read/write head is positioned to read and/or write data from/to physical tracks on a magnetic tape.

In this specification, search mode shall comprise the mode of operation of a tape drive during which movement of tape is occurring to position a portion of tape in the region of the read/write head for the purpose of locating a specific tape portion for reading data from or writing data to.

In a first embodiment of the present invention a read/write head of a tape drive is rotatably mounted between a read/write position in a data mode and a non-read/write position in a search mode.

The first specific embodiment of the present invention comprises tape drive apparatus for the reading and/or writing of data from/to an elongate band of magnetic tape. Tape drive apparatus comprises a read/write head comprising one or a plurality of read/write head elements configured to read and/or write data from/to one or a plurality of linear parallel tracks on a magnetic tape in contact with the read/write head elements.

Figure 3B:
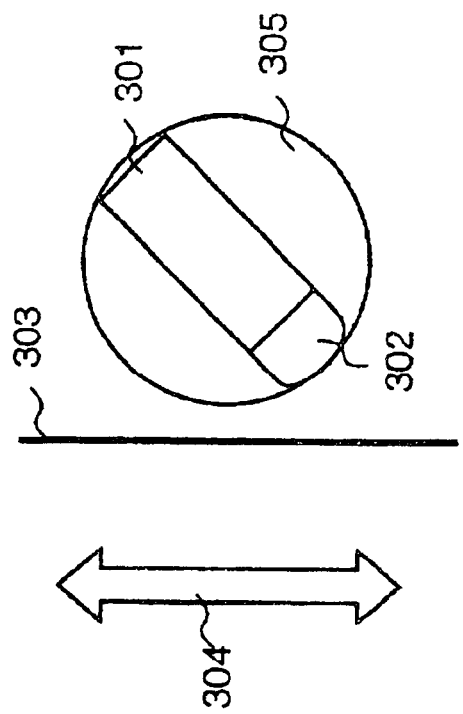
FIG. 3B illustrates diagrammatically a top view of the first specific embodiment with the read/write head in a non-read/write position.
Figure 3A:
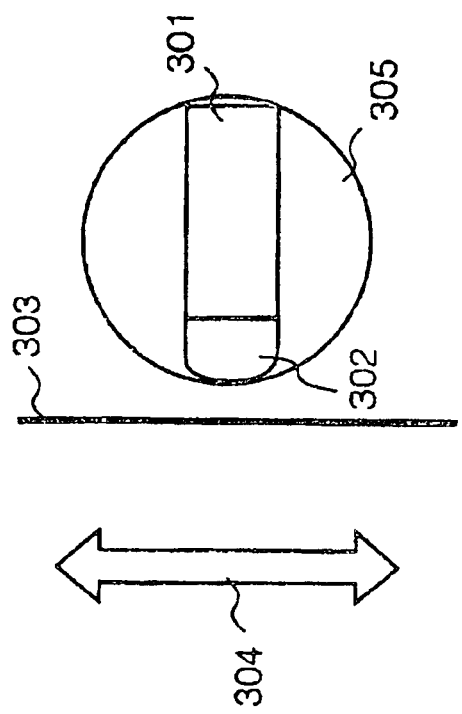
FIG. 3A illustrates a diagrammatic representation of a top view of the first specific embodiment with the read/write head in a read/write position.

FIGS. 3A and 3B illustrate diagrammatic representations of the first specific embodiment of the present invention. Referring to FIG. 3A, read/write head 301 comprising read/write head elements 302 configured for the reading and/or writing of data from/to tape 303 are illustrated in plan view. In practice, tape 303 is in contact with read/write head elements 302, however a gap between tape 303 and read/write head elements is illustrated for clarity. Arrow 304 illustrates the possible directions of movement of tape 303 past read/write head 301. FIG. 3A illustrates a positioning means 305. Positioning means 305 provides a mounting for read/write head 301 and is configured to locate read/write head 301 in position to present read/write head elements 302 to tape 303 for reading and/or writing of data from/to a tape.

In the first embodiment, positioning means 305 comprises a cylindrical or part-cylindrical shroud or support. This shroud typically comprising an approximately cylindrical ceramic pillar configured to receive the read/write head 301.

FIG. 3A illustrates the first specific embodiment in a data mode wherein the head elements 302 are presented to the tape surface for the reading and/or writing of data from/to said tape.

Positioning means 305 is rotatably mounted. Input of a command to the tape drive apparatus to commence search mode, e.g. fast forward or rewind, directs rotation of positioning means 305 throughout a pre-defined arc of rotation to re-locate read/write head 301 in a second position being a non-read/write position wherein head elements 302 are inappropriately aligned for reading and/or writing of data from/to said tape. FIG. 3B illustrates the read/write head in said second position during a search mode. Tape 303 is no longer in contact with read/write head elements 302 and accordingly read/write head element 302 wear due to movement of tape 303 past read/write head elements 302 is prevented and head element wear during search mode cannot occur.

Positioning means 305 comprises a curved tape engaging surface formed by the cylindrical or part-cylindrical shape of the positioning means 305.

Particularly, that region of positioning means 305 presented to tape 303 upon rotation between first read/write position and a second non-read/write position is curved to form a tape engaging surface. During search mode, the tape engaging surface of positioning means 305 contacts tape 303 to maintain the threaded path of tape 303 and also to maintain tape tension during search mode. Accordingly, positioning means 305 comprises a material suitable for tape surface engagement which does not affect the magnetic properties of the tape. Typically, said positioning means 305 comprises a ceramic pillar formed by a long wearing ceramic having low friction and relatively high thermal stability, an example of one such ceramic being calcium titanate.

Positioning means 305 need not be entirely cylindrical or completely disc shaped. An external surface of positioning means 305 configured to engage tape 303 following rotation of the positioning means to a second non-read/write position in the search mode is required to be suitably curved. By arranging positioning means 305 as a cylindrical structure the external circumference of the positioning means provides a tape engaging surface.

The tape drive apparatus further comprises means to effect movement of the read/write head assembly from a first read/write position to a second none read/write position. In the first embodiment, such means may comprise a motor unit configured to rotate positioning means 305, and thereby read/write head assembly 301, between said first and second position. Input of a command to enter search mode directing a motor to effect rotational movement of the positioning means 305. An alternative means to effect movement of the read/write head assembly may comprise a mechanical mechanism. Input of a command to enter search mode mechanically communicating to positioning means 305 to effect rotation to said second position. Incorporation of a resilient spring in such mechanism including a suitable rachet enabling return to said first position on further command input by the user to return to data mode.

In the search mode, the tape can be moved throughout any distance of the tape length at any speed without causing wear to the read/write head. Searching for a particular portion of tape 303 can be conducted by measuring the number of rotations of a pre-configured drive reel to calculate the length of tape pulled. When the appropriate position on the tape 303 is reached, the head assembly comprising positioning means 305 and read/write head 301 is rotated back into the data mode to the first read/write position to allow data access or recording. Movement of the read/write head to a non-tape contact position in the search mode therefore providing a means to prevent read/write head wear during tape searching.

By completely removing contact of the read/write head elements 302 from tape 303 in the search mode, significantly increased tape movement speed during search mode can be achieved.

There is no specific requirement during the transition between data mode and search mode for tape motion to be ceased. Tape 303 can continuously move past the head assembly during the transition between data mode and search mode.

Either the head 301, 302 or an outer tape bearing surface of said positioning means 305 remain in contact with the travelling tape. Because the outer surface of the positioning means 305 is of a hard ceramic material, wear on that material is reduced, whilst maintaining the positioning means within a tape pathway defined by guide rollers of the tape drive mechanism, and along which the tape passes. The positioning means 305 operates by rotating about an axis aligned in a direction transverse to a main direction of travel of the tape so as to present either the head 301, 302 or an outer surface of the positioning means to bear upon the tape.

The second specific embodiment of the present invention comprises an alternative arrangement for displacing read/write head elements from contact with a magnetic tape during search mode to prevent read/write head element wear.

Figure 4B:
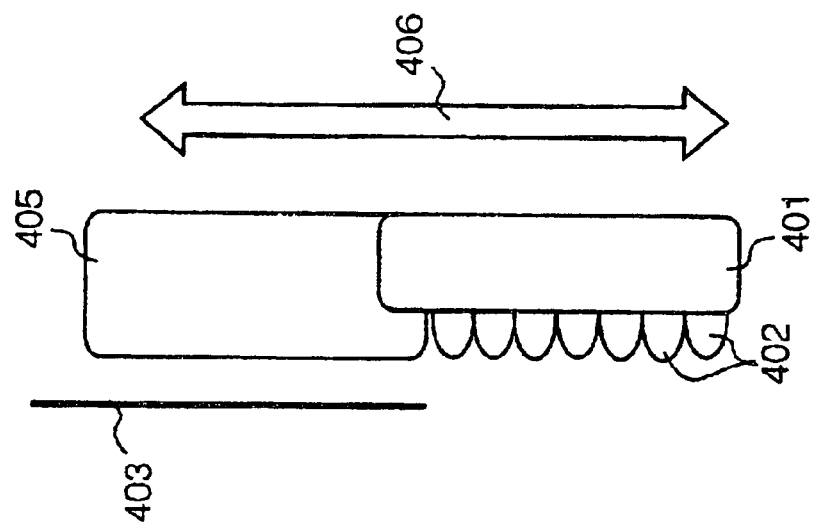
FIG. 4B illustrates the second specific embodiment with read/write head elements in a non-read/write position.
Figure 4A:
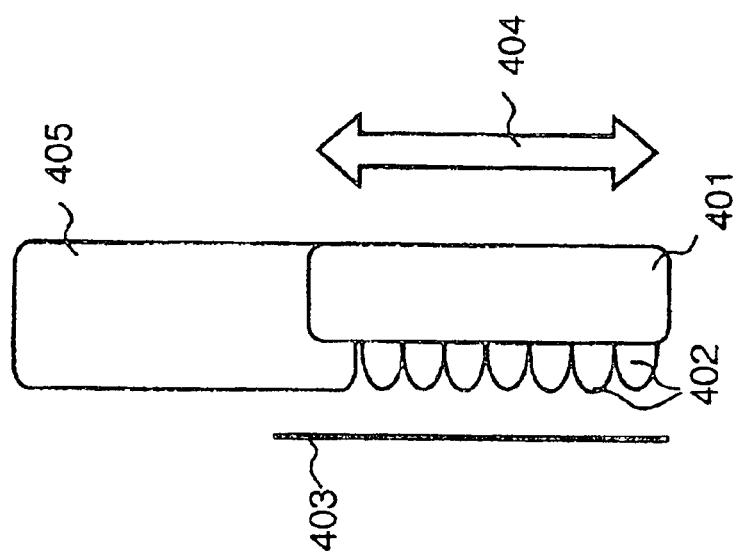
FIG. 4A illustrates diagrammatically a side view of the second specific embodiment with read/write head elements in a read/write position.

FIG. 4A and FIG. 4B illustrate the arrangement of read/write heads in a tape drive apparatus according to the second embodiment of the present invention in a data mode and search mode respectively.

Referring to FIG. 4A herein, a side view of a read/write head 401 comprising one or a plurality of read/write head elements 402 is illustrated. In FIG. 4A, the read/write head 401 is configured in a data mode such that head elements 402 are in contact with magnetic tape 403 to permit reading and/or writing of data from/to physical tracks on said tape 403. Read/write head is permitted to move within the width of tape 403 in directions indicated by arrow 404 in order to align head elements 402 for reading and/or writing of data from/to physical tracks on said tape 403.

Further referring to FIG. 4A herein, a positioning means 405 is further illustrated. Positioning means 405 comprises a guide member engaged with the read/write head assembly to position the read/write head for data access or recording. A guide engaging means on the read/write head assembly is configured to engage guide 405.

In the second embodiment of the present invention guide 405 comprises a ceramic member formed in a semicylindrical shape such that a curved surface of the guide configured for tape engagement is provided.

On input of a command to the tape drive to enter a search mode guide 405 is translated to displace read/write head 401 from a first read/write position in the data mode illustrated in FIG. 4A to a second non-read/write position in the search mode illustrated in FIG. 4B. This movement of the read/write head transverse to tape 403 results in presentation of the curved external surface of guide 405 to the tape 403. The result is that read/write head elements 402 are no longer in contact with magnetic tape 403. Guide member 405 external curved surface contacts tape 403 to maintain and support the tape path through the tape drive and to maintain and support tape tension. Rapid searching, e.g. fast forward or rewind, to locate a particular required tape portion can then be effected without wear to the head elements 402. Upon locating a required tape portion reverting to the data mode comprises translational movement in a direction indicated by arrow 406 to return the read/write head assembly into a first read/write position illustrated in FIG. 4A in the data mode. Movement of the read/write head assembly from the data mode to search mode essentially comprises movement of the read/write head elements 402 to a −1 track position.

Guide member 405 is preferably semi-cylindrical and configured to engage the read/write head assembly in order to effect displacement of said assembly on entry into the search mode. Guide member 405 comprises a ceramic member composed of e.g. calcium titanate. Other long wearing, low friction and relatively thermally stable material capable of contacting tape 403 to maintain tape tension and path without affecting the magnetic properties of tape 403 could be used to form guide member 405.

The second embodiment of the present invention therefore provides an arrangement wherein the read/write head assembly is extended by a semicylindrical guide. In the data mode illustrated in FIG. 4A, the head elements are presented to the tape surface for reading and/or writing of data. On transfer to the search mode, illustrated in FIG. 4B, the head assembly is displaced so that the head elements 402 are moved off the tape surface. The guide member 405 making contact with the tape 403 to maintain tape path and tension. Once in the search mode the tape 403 can be moved any distance at any required speed without causing wear to the read/write head elements 402. As in the first specific embodiment, in the search mode the position of the tape can be calculated by measuring the number of rotations of a drive reel and calculating the length of tape pulled. On reaching the required portion of tape, the head assembly is reversibly displaced back into the data mode allowing read/write head elements 402 to contact tape 403 to permit data access or recording.

By removing contact of tape 403 and read/write head elements 402 in the search mode and maintaining tape path and tension by contacting a tape engaging surface of the guide member 405 with tape 403 increased tape speeds during searching can be maintained without causing wear to the read/write heads. By carefully selecting a material for use as guide member 405 having a relatively low co-efficient of friction, the load to a tape drive apparatus drive motor can also be decreased.

In the second embodiment of the present invention means to effect movement of the read/write head assembly from a first read/write position to a second non-read/write position are provided. In one example, such means may comprise a solenoid configured to push the combination of guide 405 and read/write head assembly 401 from said first position to said second position. Inputting a command to return to data mode releasing the solenoid and enabling a resilient return to said first position. Alternatively, a mechanical mechanism wherein a command input by the user mechanically depresses guide 405 to displace the read/write head assembly from a read/write position to a non-read/write position. Incorporation of a resilient spring enabling return to a read/write position when a command to return to the data mode is input.

As with the first specific embodiment, in the second specific embodiment of the present invention tape 403 can continuously move past the head assembly during transition between the data mode and search mode.

In the second embodiment, a transducer head mounted upon a carriage mechanism in a tape drive mechanism is moved into a tape pathway, to bear upon a tape in a direction transverse to a main direction of travel of the tape, either in a forwards or reverse said main direction. Movement of the transducer head is by translational movement with respect to the tape pathway. Either the transducer head, or a tape bearing surface of a positioning means, preferably of a ceramic material bears against a travelling tape during a search mode, a read mode or a write mode.

Figure 5:
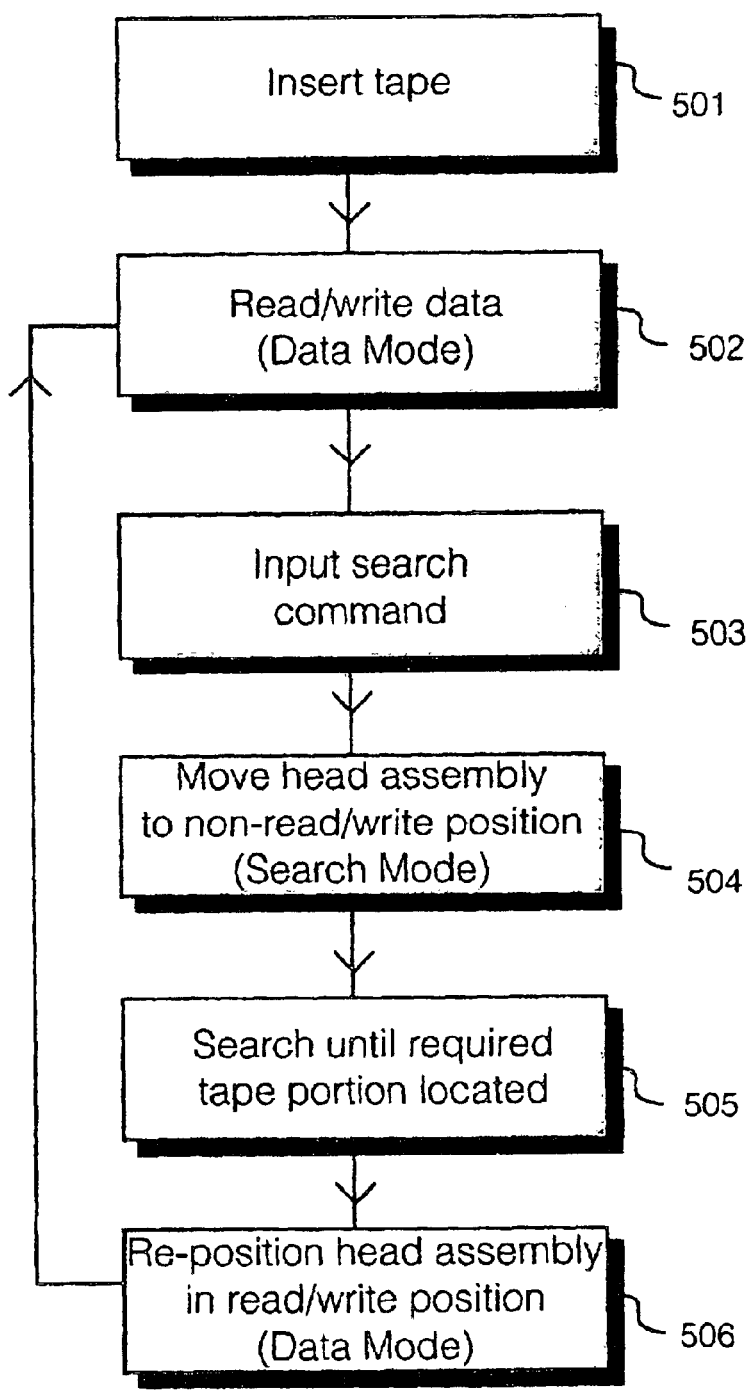
FIG. 5 illustrates schematically operational steps for transfer between data mode and search mode for any of the specific embodiments of the present invention.

Referring to FIG. 5 herein there is illustrated a schematic representation of the steps involved in the present invention between the data mode and search mode. Following insertion of tape 501 to the tape drive apparatus, instructions to read/write data in the data mode 502 are input and reading/writing of data commences. Input of a command to commence search mode 503 results in movement of the head assembly according to either of the specific embodiments described to locate the head assembly in a non-read/write position in the search mode 504. Fast searching without wear to the read/write head element can be conducted until a required portion of tape is located 505. The data mode can then be re-entered by re-positioning head assembly in a read/write position 506.

The present invention therefore provides apparatus for the moving of a read/write head assembly off the surface of a tape from which data is being read or written to. In this way it is possible to significantly increase the life of a magnetic head in a tape drive apparatus, e.g. a linear tape drive. Faster search speeds are also enabled which are of particular use in data storage, archiving and retrieval applications.

What is claimed is:

1. Apparatus for magnetic reading and/or writing of data on tape, said apparatus being operable in a data mode and a search mode, said apparatus comprising:
 a read/write head; and
 positioning means configured to position said read/write head in first and second positions
 wherein:
  during operation in said data mode, said read/write head is in said first position and is substantially in contact with said tape to permit reading of data from and writing of data to said tape;
  during operation in said search mode, said read/write head is in said second position, in which said read/write head is displaced from said tape, and is out of contact with said tape, said read/write head being configured for movement between said first and second positions; and
  during operation in said search mode, said positioning means contacts said tape to maintain a path of said tape, and a tension in said tape, and wear of said read/write head is prevented when said read/write head is in said second position.

2. Apparatus as claimed in claim 1, wherein movement of said tape past said read/write head or said positioning means occurs continuously between said data mode and said search mode.

3. Apparatus as claimed in claim 1, wherein said apparatus comprises a linear tape drive.

4. Apparatus as claimed in claim 1, wherein said read/write head is mounted on said positioning means, said positioning means being rotatable between said first and second positions.

5. Apparatus as claimed in claim 1, wherein said read/write head is mounted on said positioning means, said positioning means being rotatable between said first and second positions, said positioning means comprising at least one tape engaging surface configured to engage said tape during said search mode.

6. Apparatus as claimed in claim 1, wherein said read/write head is mounted on said positioning means, said positioning means being rotatable between said first and second positions and comprising at least one tape engaging surface.

7. Apparatus as claimed in claim 1, wherein:
said read/write head is mounted on said positioning means;
said positioning means is rotatable between said first arid second positions; and
said positioning means comprises a substantially cylindrical member comprising an external curved tape engaging surface configured to engage said tape to maintain tape path and tension during said search mode.

8. Apparatus as claimed in claim 1, wherein said positioning means comprises a guide member configured to effect said movement of said read/write head between said first and second positions.

9. Apparatus as claimed in claim 1, wherein said movement comprises a translational movement relative to an elongate path of said tape.

10. Apparatus as claimed in claim 1, wherein:
said positioning means comprises a guide member configured to effect said movement of said read/write head between said first and second positions; and
during said search mode, said guide member engages said tape to maintain tape path and tension.

11. Apparatus as claimed in claim 1, wherein:
said positioning means comprises a guide member configured to effect said movement of said read/write head between said first and second positions; and
said guide member comprises a substantially semi-cylindrical member, a curved surface of said guide member configured to engage said tape.

12. Apparatus as claimed of claim 1, wherein:
said positioning means comprises a guide member configured to effect said movement of said read/write head between said first and second positions:
said guide member comprises at least one tape engaging surface configured to engage said tape during said search mode.

13. Apparatus as claimed of claim 1, wherein:
said positioning means comprises a guide member configured to effect said movement of said read/write head between said first and second positions: and
said guide member comprises at least one tape engaging curved surface configured to engage said tape during said search mode.

14. Apparatus as claimed in claim 1, wherein said positioning means comprises a ceramic material.

15. A method of reducing read/write head wear in an apparatus as claimed in claim 1, said method comprising:
moving said read/write head from said first position to said second position for tape searching, thereby preventing read/write head wear during said search mode; and
contacting said positioning means and said tape during said search mode to maintain tape path and tension.

16. Apparatus for magnetic reading of data from tape and writing of data to tape, said apparatus operable in a data mode and a search mode, said apparatus comprising:
a read/write head; and
a positioner configured to position said read/write head into a first position and into a second position;
wherein:
during operation in said data mode, said read/write head adopts said first position and, in said first position, said read/write head is maintained substantially in contact with said tape to permit reading of data from and writing of data to said tape;
during operation in said search mode, said read/write head adopts said second position in which said read/write head is displaced from contact with said tape, said read/write head being configured for movement between said first and second positions; and
during operation in said search mode, said positioner contacts said tape to maintain a path of said tape and a tension in said tape, and wear of said read/write head is prevented because the read-write head does not contact said tape.

17. Apparatus for magnetic reading and writing of data on tape, said apparatus operable in a data mode and a search mode, said apparatus comprising:
a read-write head; and
a positioner configured to position said read-write head into a first position and into a second position;
wherein:
during operation in said data mode, said read/write head is in said first position and, in said first position, said read-write head is maintained substantially in contact with said tape to permit reading data from and writing data to said tape; and
during operation in said search mode, said read-write head is in said second position, in which said read-write head is displaced from contact with said tape, said read-write head being configured for movement between said first and second positions;
during operation in said search mode, said positioner contacts said tape to maintain tape path and tension, and wear of said read/write head in said second position being prevented; and
movement of said tape past said positioner occurs continuously between said data mode and said search mode.

18. Apparatus for magnetically reading data from tape and magnetically writing data to tape, said apparatus operable in a data mode and in a search mode, said apparatus comprising:
a read/write head; and
a positioner configured to position said read-write head in a first position and in a second position, wherein:

during operation in said data mode, said read/write head is in said first position and, in said first position, said read-write head is maintained substantially in contact with said tape to permit reading of data from said tape and writing of said data to said tape;

during operation in said search mode, said read-write head adopts said second position, in which said read/write head is displaced from contact with said tape, said read-write head being configured for movement between said first and second positions;

during operation in said search mode, said positioner contacts said tape to maintain a path of said tape and to maintain tension in said tape and wear of said read/write head is prevented because the read-write head does not contact said tape;

movement of said tape past said positioner occurs continuously between said data mode and said search mode; and said positioner comprises a substantially cylindrical member having an external curved tape engaging surface configured to engage said tape to maintain tape path and tension during said search mode.

19. A method of reducing read/write head wear in an apparatus for magnetic reading of data from and writing of data to a tape, said apparatus operable in a data mode and a search mode, said apparatus comprising:

a read/write head; and a positioning means configured to position said read/write head in first and second positions;

said method comprising:

moving said read/write head from said first position to said second position for tape searching thereby preventing read/write head wear during said search mode; and contacting said positioning means and said tape during said search mode to maintain tape path and tension in said tape, wherein:

during operation in said data mode, said read/write head is in said first position and is substantially in contact with said tape to permit reading of data from and writing of data to said tape; and during operation in said search mode, said read/write head adopts said second position, in which said read/write head is displaced from said tape, and is out of contact with said tape, and said positioning means contacts said tape to maintain a path of said tape and a tension in said tape, and wear of said read/write head is prevented because said read/write head is out of contact with said tape, when the read/write head is in said second position.

20. A method of reducing head wear in an apparatus for magnetic reading and writing of data on tape, said apparatus comprising:

a read/write head; and positioning means configured to position said read/write head in first and second positions, said method comprising:

during operation in a data mode, maintaining said read/write head in said first position in which said read/write head is substantially in contact with said tape to permit reading of data to and writing of data from said tape; and during operation in a search mode, maintaining said read/write head in a second position in which said read/write head is displaced from said tape, so as not to contact said tape;

switching said read/write head between said first position and said second position to change operation of said apparatus between said data mode of operation and said search mode operation;

during operation in said search mode, said positioning means contacts said tape to maintain a path of said tape and a tension in said tape; and during operation in said search mode, wear of said read/write head is prevented, by positioning of said read/write head away from and out of contact with said tape.

* * * * *